United States Patent
Caldwell

(10) Patent No.: US 9,805,359 B2
(45) Date of Patent: Oct. 31, 2017

(54) METHOD OF UTILIZING A SUCCESSFUL LOG-IN TO CREATE OR VERIFY A USER ACCOUNT ON A DIFFERENT SYSTEM

(75) Inventor: Ryan Caldwell, Provo, UT (US)

(73) Assignee: MX TECHNOLOGIES, INC., Lehi, UT (US)

( * ) Notice: Subject to any disclaimer, the term of this patent is extended or adjusted under 35 U.S.C. 154(b) by 0 days.

(21) Appl. No.: 13/573,308

(22) Filed: Sep. 8, 2012

(65) Prior Publication Data

US 2014/0195426 A1    Jul. 10, 2014

(51) Int. Cl.
*G06Q 20/32*      (2012.01)
*G06Q 20/10*      (2012.01)

(52) U.S. Cl.
CPC ......... *G06Q 20/3223* (2013.01); *G06Q 20/10* (2013.01)

(58) Field of Classification Search
CPC .............................. G06Q 40/00; G06Q 40/02
See application file for complete search history.

(56) References Cited

U.S. PATENT DOCUMENTS

| | | | | |
|---|---|---|---|---|
| 2001/0037296 A1* | 11/2001 | Ganesan et al. | ................ | 705/40 |
| 2009/0144749 A1* | 6/2009 | Van Luchene | .... | G06F 17/30864 719/313 |
| 2009/0172402 A1* | 7/2009 | Tran | ..................... | G06Q 20/102 713/170 |
| 2009/0276368 A1* | 11/2009 | Martin et al. | ................ | 705/36 R |
| 2012/0116967 A1* | 5/2012 | Klein | ..................... | G06Q 40/02 705/42 |
| 2012/0150706 A1* | 6/2012 | Hashir | ................... | G06Q 30/04 705/34 |
| 2012/0239552 A1* | 9/2012 | Harycki | .......................... | 705/38 |
| 2012/0311322 A1* | 12/2012 | Koyun | ............... | G06Q 20/3227 713/156 |
| 2013/0268434 A1* | 10/2013 | Mohsenzadeh | ................ | 705/40 |

* cited by examiner

*Primary Examiner* — Jagdish N Patel
*Assistant Examiner* — Liz P Nguyen
(74) *Attorney, Agent, or Firm* — Kunzler Law Group, PC

(57) ABSTRACT

A method is permitted to permit remote log in credential authentication for mobile users seeking access to a computer system through a second party computer system such as an aggregator.

20 Claims, 2 Drawing Sheets

METHOD OF UTILIZING A SUCCESSFUL LOG-IN TO CREATE OR VERIFY A USER ACCOUNT ON A DIFFERENT SYSTEM

BACKGROUND

Often there is an online set of credentials that identify a user and match them to a piece or set of data that a third party would like to have that user matched to. The present invention is a method to use the success or failure of an online log-in using a set of credentials to create or verify a user on another system and/or match the user on the to a piece or set of data on a third system.

The invention has many uses across many industries, but will be discussed with regard to a specific example. There is a specific application of the invented method that solves an acute need in the world of online banking. Financial institutions (including banks, credit unions and other institutions that hold or process money for customers) have recognized the desire of customers or members to access their accounts, view financial data, and perform transactions online from a remote location such as from a home or office rather than in-person in a physical bank, or credit union, stock brokerage, etc. Customers, members and account holders (hereinafter "customers") often find online banking more convenient and efficient than having to visit a branch in person and the number that find online banking more convenient is increasing.

To facilitate online banking, financial institutions (hereinafter "FI") establish their own or contract with an online banking provider (OLBP) which allows the FI's customers to access their accounts and perform transactions through a remote computer system rather than in-person at the FI's physical location. Referring to FIG. 1, an example of such a system is depicted.

In FIG. 1, the FI 101 typically creates and manages all accounts as well as processes all transactions through or using the FI's core computer system (or core banking system) 102. That is where confidential data such as customer or member account information is stored, such as on a data store 102a. An OLBP 103 is established to provide an online banking interface with the FI's customers. The OLBP utilizes custom APIs to establish its access to information on the FI's core computer system. The OLBP 103 will typically store or connect to certain information, like usernames and passwords that allow a user to access online banking; on a database it controls or has access to.

In the prior art in a traditional OLBP arrangement, an FI's customers have accessed their financial accounts held at the individual's bank or credit union through the institution's OLBP 103 via a remote desktop computer 109. That computer may be located at a home, office or elsewhere. Such interaction was typically conducted through the internet or other network. The OLBP utilizes a web server to maintain such service.

With the growing popularity and ubiquity of mobile computing devices (hereinafter "MCD" 106), such as smart phones (Apple iPhone® and Android® phone), tablet computers (Apple iPad®, etc.), and other mobile devices, FI customers now wish to access their accounts and conduct their financial transactions wirelessly from those MCDs. However due to size constraints, device limitations, the strong preference for native apps, etc., the standard OLB experience does not normally work well on these MDCs.

Mobile banking providers (hereinafter "Mobile Banking Provider" or "MBP" 108 with its own data store 108a) arose to bridge this gap in user experience and develop sites that can be viewed better on the smaller screen of MCDs, as well as create native apps that work on the MCDs. In order for a user to authenticate to an MCD and gain access to their banking information, the MCD would normally need to have a connection to the OLBP that would allow the authentication to occur via an API or similar connection that involves some work or authorization from the OLBP for the MBP to connect in that way. Not all OLBPs are willing to allow this type of connection to MBPs and many charge burdensome or prohibitive fees to do so. The OLBP can also take a very long time to do the work/authorization on their side to allow the MBP to connect this way. Some relationships that MBPs desire to form with OLBPs may never come about, which may result in the financial institution not being able to provide certain mobile account functionality to its customers. Consequently an MBP investing in an application to support mobile banking on a particular MCD cannot be certain when, if ever, the application in question will be able to integrate with a particular FI. And with approximately 13,000 banks and credit unions in the United States alone, the task of creating necessary integrations with each financial institution's OLBP is enormous.

It is important to note that MBP are not alone in this, any provider wishing to provide services to a FI that wants users' accounts behind the OLBP wall would usually need to pair its users to OLBP user data behind that wall.

The limitations of this situation in the prior art should be obvious. Not only is it time-consuming and expensive to create the necessary relationships with the OLBPs and write all of the APIs, but those OLBPs must be maintained at great expense. The MBP also has no guarantee that the OLBP or similar partner will ever grant the authorization or do the work needed for the MBP to connect in this manner.

Further, as FIs generally focus on the banking business and not on the software development business or even on new technologies such as mobile devices and mobile banking, it is typically left to third party application developers and MBPs to develop relevant new software applications.

Many FIs are under arduous and lengthy contracts with OLBPs that are not motivated to integrate best of breed new technologies, especially those the OLBP feels are a threat. In these situations the OLBPs often act like a "troll" that will either inflict punishing integration fees, costing the FI more than the MBP service in the first place to try to keep a competitor out. Often, the OLBP will unfortunately do this even if it is against the FI's wishes and best interest and even though the FI is supposed to be the customer the OLBP is meant to serve. This is a very abusive practice by the OLBP, the entrenched provider. Making matters even worse for the FI or the customer that is meant to be served, some OLBPs will simply not allow anyone to cross that integration bridge even if the FI or MBP is willing to pay the abusive fee.

At best the process of a MBP having to integrate with an OLBP in order to serve an FI is slow, inefficient and costly. At worst, it is either impossibly expensive or simply blocked, to the detriment of the FI.

The prior art reveals a clear need for a way to provide efficient connectivity between MCDs and FIs other than either working one at a time through OLBPs or establishing a connection direction with each of the many FIs. The invention seeks to provide a more efficient method or technique for MBP's to authenticate account information in order to correlate with financial institutions banking platforms and support mobile banking, PFM and other applications of that nature for all or substantially all financial institutions.

DETAILED DESCRIPTION

A key tool for PFM and other forms of online financial activity has been the advent of aggregators or account aggregators which compile information from different FIs, various credit card accounts, investment accounts, retirement accounts and other information wherever it can be acquired, including but not limited to non-financial data and even things like weather or the like. Some aggregators currently in existence are Yodlee, ByAllAccounts, Digital Insight, and CashEdge.

In order to avoid the problems inherent in directly interfacing with every FI's OLBP via an API or similar OLBP authorized connection in order for the MBP to support mobile banking, PFM or other financial applications through MCDs, a new route to authenticating financial data must be utilized instead.

The invention herein achieves credential verification, account authentication and/or access to account data related to the FI via a third party account aggregator, custom screen scrape, or any method or third party that uses a successful login into an FI or other computer system, thereby allowing the MBP to circumvent the direct API OLBP authorized connection or similar connection to the OLBP otherwise needed. For the purposes of this document, credential verification could be account name and password, retina scan, fingerprint scan, DNA check, voice print, or any other verification that the user attempting access to a computer system has the right to achieve that access.

As structured, the invention solves many problems. The expense and time needed to create numerous APIs and otherwise work with OLBS or directly with FIs is eliminated. And the OLBPs which may be reluctant to work with a MBP no longer stand in the way of mobile financial transaction implementation, nor would those potentially onerous or abusive practices which have been seen in the past.

Figure 1:
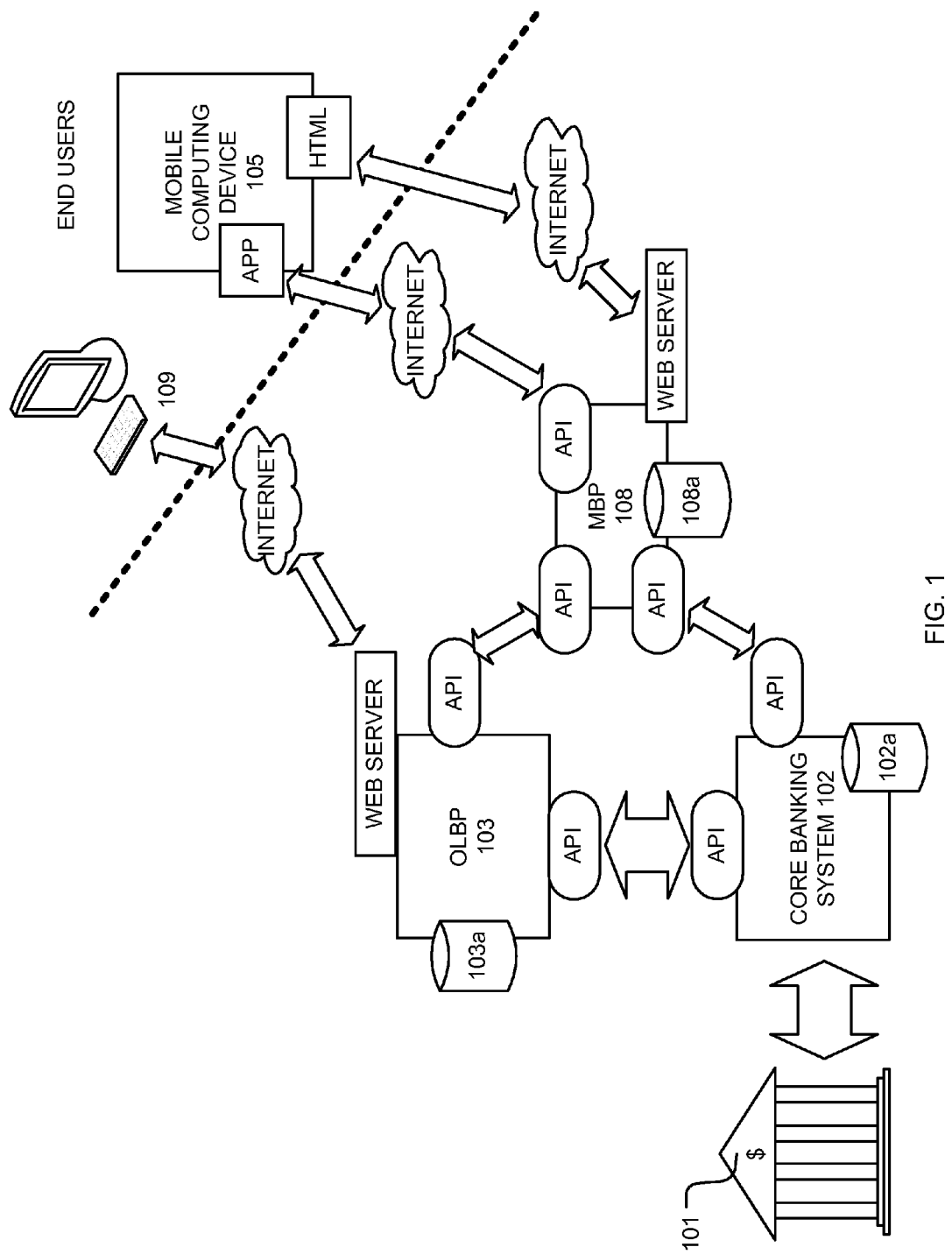
FIG. 1 depicts prior art online and mobile banking.
Figure 2:
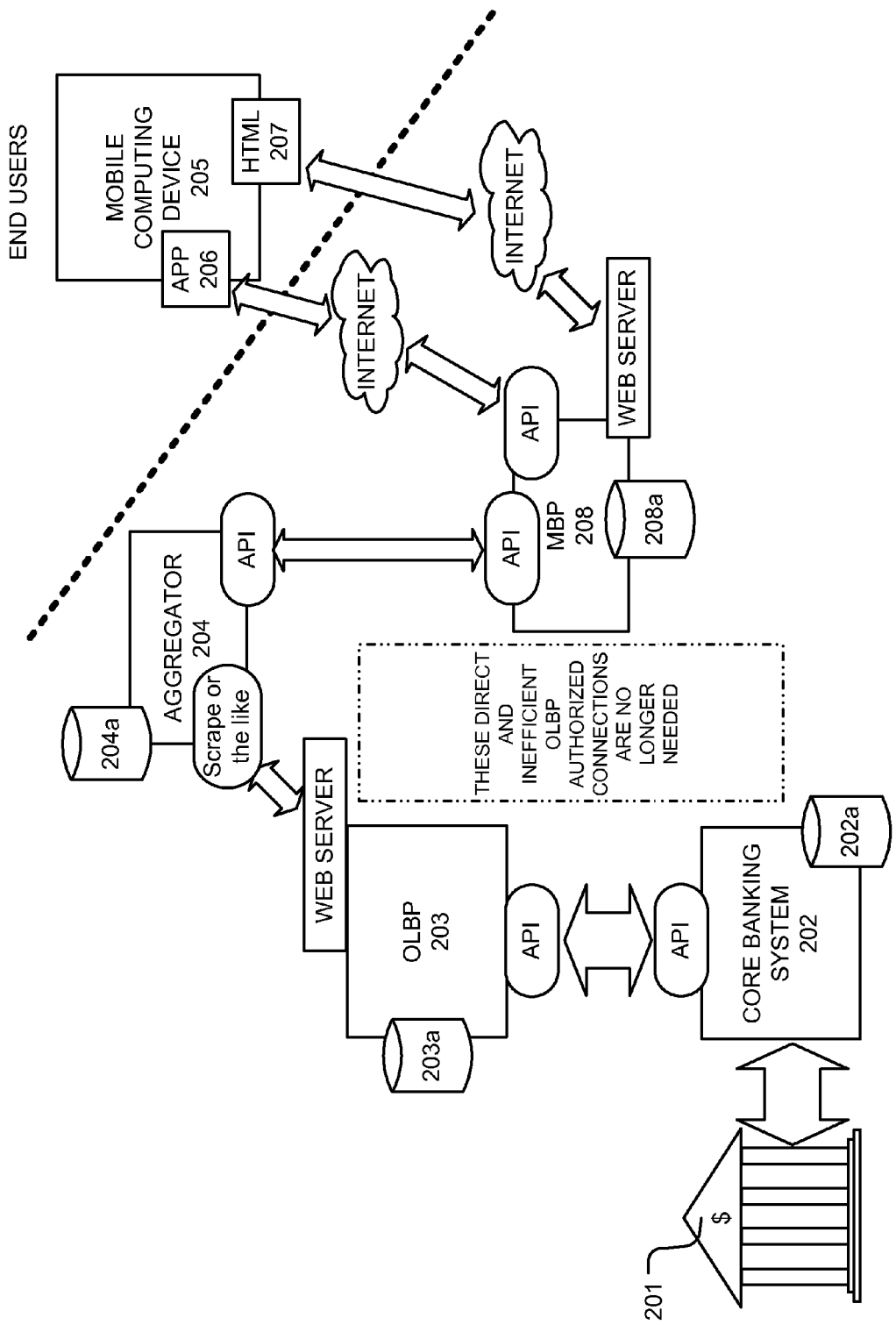
FIG. 2 depicts an example implementation of the invented mobile banking authentication.

Referring to FIG. 2, an example implementation of the invention is shown. Am FI 201 has a core computer system 202 with data store 202a to handle its transactions. The FI 201 has established or contracted with an OLBP 203 typically with its own data store 203a. The OLBP can provide traditional online transactions as discussed with respect to FIG. 1, but may or may not provide mobile banking, PFM or other more sophisticated mobile applications. The OLBP 203 data store 203a may contain various information including login information, account information, credential information, security information, etc.

Account aggregators 204 routinely obtain and maintain financial and other information (in a database 204a) from numerous FIs and other sources in a single place which can be consumed in a defined data format. The invention takes advantage of this by choosing to work with FIs or other similar computer systems through aggregators 204 rather than establishing a custom connection between each MBP and OLBP, Core or other party for each financial institution as previously described for FIG. 1.

Using the inventive concept, a MCD 205 has a MBP application 206 running on it for accessing an MBP 208 through the internet, other network, or any other data communication medium. The MCD may alternatively have a HTML site 207 that it is using access services or pages located on the MBP servers. The MBP 208 maintains its own separate data store 208a with information which may include credentials such as username and password information for users of the app, as well as any other security information which may be desired such as social security number, address, mother's maiden name, etc.

When the user of a MCD 205 starts the app 206, he or she is prompted for username, password and any other desired security information. The user enters such information and the app 206 authenticates the user account through the MBP's data store 206a. Initially, the app passes the user name, password, and any other security information which may be needed to a selected account aggregator 204 who will then authenticate the user's account. That authentication may or may not occur by the FI's OLBP's confirmation of username, password and possibly security information with information stored on the OLBP's data store 203a.

A key concept in the invention is to utilize a third party, such as an account aggregator 204 to perform account authentication for a user of MBP or any other desired software package. In such as system, a MCD user desires to access a FI or other institutional or business computer system which requires credential verification. Rather than directly contacting the FI or institution core computer system, or working through the traditional but cumbersome OLBP, the MCD works through a third party computer system such as an aggregator in order to perform credential verification.

It should be noted that when this system or method is in place, the user may log into the desired app, such as a mobile banking app, on his or her MCD, and then achieve separate access to the FI's account information through an aggregator. Thus, two log-ins and two credential verifications may occur, although the software can be designed so that only one is visible to the user. In the example embodiment, once the user has logged into the MBP's mobile banking app, he or she has access to all of the financial account information within the mobile application that he or she would have access to through the user's typical experience with other forms of remote banking.

Further, although not required, the MBP's application interface can be configured to mimic the appearance of the FI's software so that the user cannot distinguish between conducting transactions through the MBP versus the FI.

It is possible for an account aggregator to have user information in its own data store and to use that data store for authentication of a mobile user rather than going through an OLBP for authentication. This patent is not limited by the way in which the third party performs credential verification or authentication of a mobile user.

Once the user's information has been authenticated or confirmed, then from his or her MCD the user has access to all of his or her financial and banking information now available through the MBP or on any separate system. The user now has full access to financial data through his or her MCD and can conduct any type of financial activity, including reviewing account information, bill pay, money transfer, check deposit, etc. This avoids the need for a direct connection or data feed between the MCD its MBP and the OLBP. Since account aggregators and other third parties are commercial services generally available and which have data available in a common format, it is very simple, efficient and quick for the MBP to establish a data transfer connection between a MCD and an account aggregator while maintaining account security through proper credential verification.

It should be noted that additional security features may be implemented as well. For example, when a user creates his or her account in the mobile banking software application or with the MBP, email authentication of the account can be required. In addition, it may be desirable to require other information, such as taxpayer identification number, address, account numbers, mother's maiden name, etc. for security purposes.

Due to the use of a separate data store by the MBP (hereinafter "Mobile Data Store"), it is possible for the password and other security information possessed by a particular FI and that possessed by the Mobile Data Store to be out of sync. For example, if from a desktop computer, a user were to change his or her password with the OLBP, that password would be stored at the OLBP data store or at the aggregator data store. But the password change would not automatically flow through to the Mobile Data Store. Therefore when the user logs in to their MCD after that particular change, he or she would be able to enter log-in information into the mobile banking software application or with the MBP on the MCD, but the password would not authenticate through the third party or account aggregator. In that event, the user would need to recall that he or she made a password change at the FI or with the OLBP and then enter that new password for authentication by the mobile banking software application or MBP on the MCD in order to access his or her full banking information. Other alternative methods could be used for the user to obtain the changed password such as the user could request to have the password e-mailed to his or her account through the financial institution or OLBP.

As of the time of the drafting of this document, online banking through an OLBP via a desktop computer is already shifting from being the user's typical experience to that of mobile access. Since there is a clear trend toward users shifting more of their processing functionality to MCDs, and many users already spend a great multiple of time on their MCD compared to on a traditional desktop computer, in the future the user's dominant experience with banking will become mobile banking through a mobile banking software application or MBP on a MCD, as shown in FIG. 2. That process is now made simple, easy and efficient through the invention which utilizes a third party (such as account aggregators) to authenticate mobile access to financial information and conduct mobile banking activities previously only available through a direct back-end API connection between bank-specific stand-alone mobile banking provider computer systems and the OLBP.

The invention may be viewed as a method of utilizing a successful login/authentication to create a corresponding user account on a different system, or computer software which performs the same. The user account created on a different system is the account stored in the MBP data store.

Viewed as a method, one example of the invention can involve several steps, generally described as follows. A user must establish one or more accounts with one or more financial institutions, unless those accounts already exist. Those financial institutions will process and keep the user's account information on a core computer system. The financial institutions will also provide access to the user's account information through an OLBP. The OLBP, as part of its standard business practices, provides customer or member banking information to one or more third party account aggregators. The account aggregators collect financial information about various users from various financial institutions and store it in a single place in a common data format. The account aggregators, or other third party will also make that information available to their subscribers who can show that they have a right to access the information, such as through user name and password authentication. Separately, a software developer or PFM Provider will develop a mobile banking computer software application for a particular mobile computing device. That developer or PFM Provider will also establish a relationship with a third party such as an account aggregator and request account access verification whenever a user attempts log-in to their mobile account with the financial institution in order to access his or her financial information. The mobile device software application or PFM Provider will pass the user's login information and security information as required to the third party, such as an account aggregator, who will authenticate it prior to permitting the user to access financial data. The user will then view account information on the mobile device through the mobile device software application or the PFM Provider. Any transactions conducted by the user with his or her mobile device will be reflected in the OLBP data store and be processed by the financial institution's core computer. These and other method steps can be included or omitted as desired in a particular implementation of the invention Viewed as software, one example of the invention includes several components. A program runs on a mobile computing device. A means for establishing a user account is provided. A means for storing user account information in a data store is provided. This is different from the bank's data store with account information, and different from any data store that banking aggregators may maintain. A means for allowing a user to log in to the mobile device application is provided. A means for receiving financial information from a banking aggregator is provided. A means for authenticating user credentials is provided, that means having the capability of authenticating the user's login information with the banking aggregator in order to gain access to that specific user's account information. Means for displaying financial or account information to a user allows a user to view his or her account information. And means for accepting banking transaction requests from a user and forwarding them to a financial institution through a banking aggregator is provided. That allows the user to conduct banking transactions through the third party banking aggregator rather than interfacing with a bank's MBP.

As it to be understood herein, the invention is not just a mobile banking login or account creation. It will be possible to use the invention for credential verification or authentication of any type of account or any type of computer system access, therefore the invention is not limited in any way to the field of banking. The invention will successfully pair data from a remote computer system with a mobile device through an aggregator service, keeping such data synced or updated during use.

While the present invention has been described and illustrated in conjunction specific embodiments, those skilled in the art will appreciate that variations and modifications may be made without departing from the principles of the invention as herein illustrated, described, and claimed. The present invention may be embodied in other specific forms without departing from its spirit or essential characteristics. All described embodiments are to be considered in all respects as only illustrative, and not restrictive. The scope of the invention is, therefore, indicated by the appended claims, rather than by the foregoing description. All changes which come within the meaning and range of equivalency of the claims are to be embraced within their scope.

The invention claimed is:
1. A method comprising:
  establishing an electronic connection with a mobile computing device over a computer network, the mobile computing device having a processor, an input device, and a display device, the computer network comprising the Internet;

providing a mobile banking software application to a user to execute on the mobile computing device;

executing the mobile banking software application on the mobile computing device;

receiving a user's login information for the mobile banking software application from the input device of the mobile computing device, the received login information corresponding to an account for the user at a financial institution, the financial institution comprising a user verification system accessible through an application programming interface ("API");

establishing an electronic connection with a banking aggregator over the computer network, the banking aggregator comprising a remote third-party server that compiles financial information for the user from a plurality of different financial institutions where the user has an account;

transmitting the user's login information over the computer network to the banking aggregator through the mobile banking software application;

performing, by the banking aggregator, a screen scrape of an online interface of the financial institution;

identifying, by the banking aggregator, one or more login fields for the financial institution based on the screen scrape;

inputting, by the banking aggregator, the user's login information into the one or more identified login fields;

verifying, by the banking aggregator, the user's login information by attempting to log in to the financial institution where the user has an account using the user's inputted login information, the banking aggregator bypassing the financial institution's user verification API to verify the user's login information;

receiving financial information pertaining to the user's account from a financial institution over the computer network in response to the banking aggregator successfully logging into an online banking platform for the financial institution using the user's login information;

displaying the received financial information pertaining to the user's account within an interface of the mobile banking software application executing on the mobile computing device;

receiving, over the computer network, data relating to a financial transaction entered by the user within the mobile banking software application executing on the mobile computing device;

transmitting, over the computer network, the financial transaction data to the banking aggregator, the banking aggregator forwarding the financial transaction data to the relevant financial institution for processing;

receiving, over the computer network, confirmation that the banking transaction has been conducted; and displaying the confirmation to the user within the interface of the mobile banking software application executing on the mobile computing device.

2. The method as recited in claim 1, wherein the banking aggregator submits the banking transaction to a financial institution through an online banking provider.

3. The method as recited in claim 1, wherein the credential verification includes verification of username and password.

4. The method as recited in claim 1, wherein the credential verification includes verification of username and password with the financial institution's online banking provider.

5. The method as recited in claim 1, wherein the credential verification is conducted without use of the financial institution's mobile banking provider.

6. The method as recited in claim 1, wherein the banking aggregator is a third party to said financial institution.

7. The method as recited in claim 1, wherein the banking transaction takes place in the financial institution's core computer system.

8. The method as recited in claim 1, wherein the mobile computing device includes a telephone.

9. The method as recited in claim 1, wherein the mobile banking device has an internet browsing capability.

10. The method as recited in claim 1, wherein the method further comprises wirelessly transmitting and receiving data from a remotely located computer.

11. The method as recited in claim 1, further comprising verifying user login information on a data store maintained by a vendor of the mobile banking software application.

12. The method as recited in claim 1, wherein the mobile computing device is a hand-held mobile computing device.

13. A method comprising:

establishing an electronic connection between an aggregator system and a first computer system over a computer network, the first computer system having a processor, an input device, and a display device, the aggregator computer system comprising a remote third-party server that compiles financial information for a user from a plurality of different financial institutions where the user has an account, the computer network comprising the Internet;

receiving login data by the aggregator computer system over the computer network from the first computer system, the login data permitting a user to login to said first computer system, the received login data corresponding to an account for the user at a third-party system, the third-party system comprising a user verification system accessible through an application programming interface ("API"), the third-party system comprising a system at a financial institution;

performing a screen scrape of an online interface of a third-party system maintaining an account for the user, the aggregator computer system attempting to log the user into the third party system using the received login data based on the data scrape of the web interface to verify the user's login data, the aggregator computer system bypassing the third-party system's user verification API to verify the user's login data; and providing data received from the third-party system pertaining to the user's account to the first computer system over the computer network, the first computer system displaying the received data within an interface of an application executing on the first computer system.

14. The method as recited in claim 13, wherein the data pertinent to the user is financial data.

15. The method as recited in claim 13, wherein each of the first computer system, the aggregator computer system and the third party computer system each has its own data store.

16. The method as recited in claim 13, further comprising receiving transactions at the aggregator computer system from the user and forwarding the received transactions to the third party computer system for processing.

17. The method as recited in claim 13, wherein data from the aggregator computer system and the first computer system are synced.

18. The method as recited in claim 13, wherein data from the aggregator computer system, the first computer system, and the third party computer system are synced.

19. The method as recited in claim 13, wherein the first computer system is a mobile computing device.

20. A system comprising:

a mobile computing device, the mobile computing device comprising a processor, an input device, and a display device, the mobile computing device configured to execute a mobile banking software application; and a remote third-party server comprising a banking aggregator in electronic communication with the mobile computing device over a computer network, the banking aggregator compiling financial information for a user from a plurality of different financial institutions where the user has an account;

wherein the mobile banking software application receives login information for the user, the received login information corresponding to an account for the user at a financial institution, the financial institution comprising a user verification system accessible through an application programming interface ("API"), wherein the mobile computing device transmits the user's login information over the computer network to the banking aggregator through the mobile banking software application, wherein the banking aggregator performs a screen scrape of an online interface of the financial institution, wherein the banking aggregator identifies one or more login fields for the financial institution based on the data scrape, wherein the banking aggregator input the user's login information into the one or more identified login fields, wherein the banking aggregator verifies the user's login information by attempting to log in to the financial institution where the user has an account using the user's inputted login information, the banking aggregator bypassing the financial institution's user verification API to verify the user's login information, wherein the mobile computing device, through the mobile banking software application, receives financial information pertaining to the user's account from a financial institution over the computer network in response to the baking aggregator successfully logging into an online banking platform for the financial institution using the user's login information, and wherein the mobile computing device displays the received financial information pertaining to the user's account within an interface of the mobile banking software application.

* * * * *